Dec. 24, 1940.                J. K. HOLBROOK                2,225,832
                              RECORDING CAMERA
                         Filed March 5, 1938        3 Sheets-Sheet 1
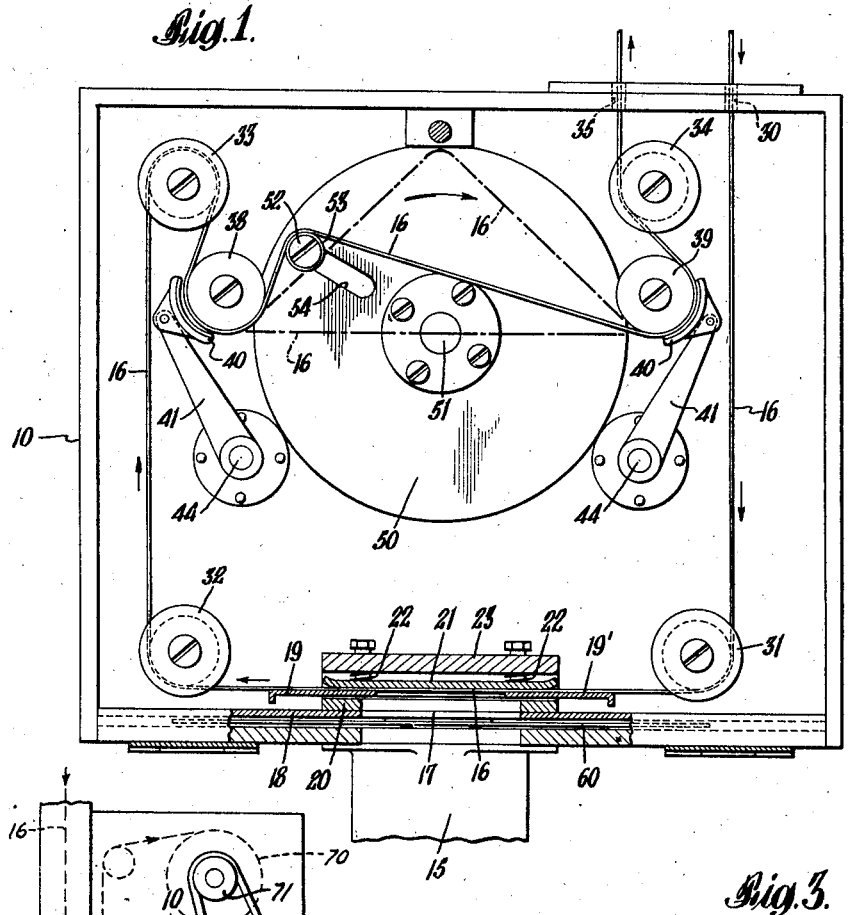
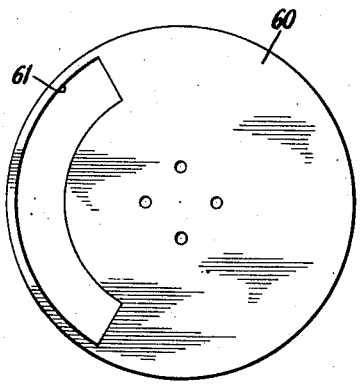
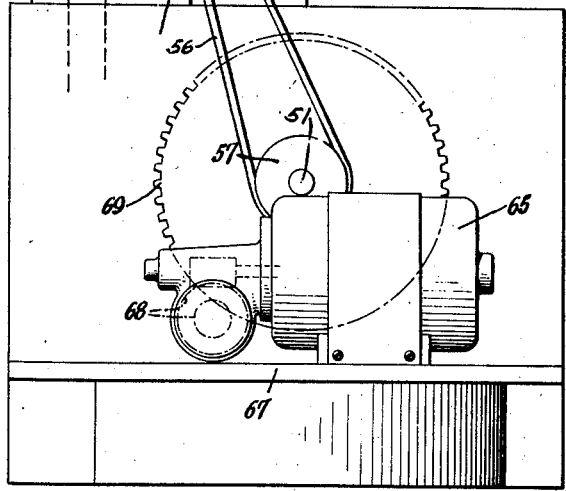

Dec. 24, 1940.  J. K. HOLBROOK  2,225,832
RECORDING CAMERA
Filed March 5, 1938   3 Sheets-Sheet 2

INVENTOR
John K. Holbrook
BY
Morgan Finnegan and Durham
ATTORNEYS

Dec. 24, 1940.  J. K. HOLBROOK  2,225,832
RECORDING CAMERA
Filed March 5, 1938   3 Sheets-Sheet 3

INVENTOR
John K. Holbrook
BY
Morgan Finnegan and Durham
ATTORNEYS

Patented Dec. 24, 1940

2,225,832

UNITED STATES PATENT OFFICE 2,225,832

RECORDING CAMERA

John Knight Holbrook, New York, N. Y.

Application March 5, 1938, Serial No. 194,026

5 Claims. (Cl. 88—18.5)

The present invention relates to a novel and improved recording camera and more particularly to a camera adapted to take a succession of record photographs in rapid succession.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate two embodiments of the invention, and together with the description, serve to explain the principles of the invention.

Of the drawings:

Figure 1 is a vertical section of an illustrative and typical embodiment of the present invention;

Figure 2 is an end elevation of the camera shown in Figure 1;

Figure 3 is a detailed plan view of the shutter employed in the present embodiment;

Figure 4:
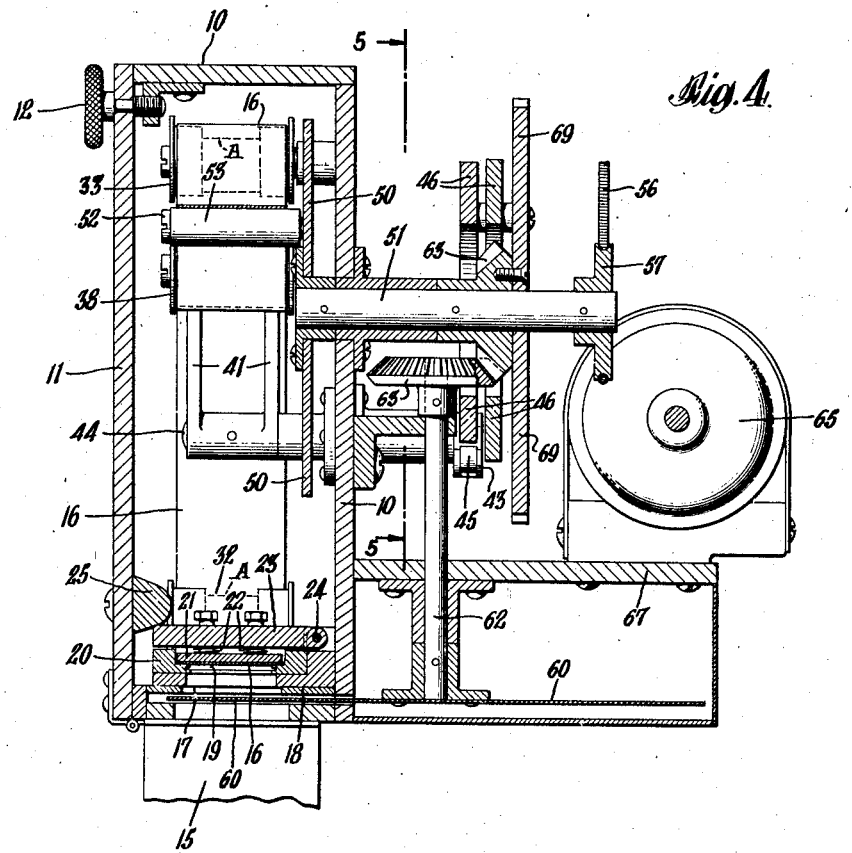
Figure 4 is a vertical section of the camera, taken on a plane at right angles to the section shown in Figure 1.
Figure 5:
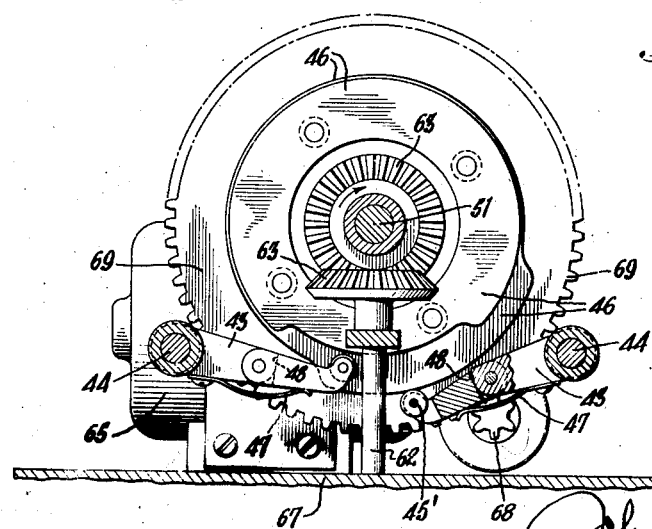
Figure 5 is a detailed section taken on the line 5—5 of Figure 4.

The present invention has for its object the provision of a novel and improved recording camera adapted to photograph a succession of records on a long and relatively narrow strip of film. A further object of the invention is the provision of an improved recording camera in which either perforate or imperforate film may be employed, and in which the area of the film exposed to the image may be varied as required by the record to be made.

In the past record cameras have generally employed perforate film so that the film could be accurately fed, but such film wastes a large percentage of the film which might otherwise be used if the film could be exposed to its margins. Where imperforate film has been fed intermittently, the exposure area of the film has not been held to its closest limits due to the irregularities and inaccuracies of the imperforate feeding mechanisms heretofore provided. Consequently, these film feeding cameras have wasted film between successive exposures. The present invention provides a recording camera in which the film is fed intermittently with great accuracy and which uses imperforate film, although perforate film and film of different widths may be employed if desired.

As illustratively embodied, the recording camera of the present invention comprises a lens, a rotary shutter, means for accurately positioning a strip of film in the focal plane of the lens and means for intermittently feeding the film past the exposure area during the time the shutter is closed. This intermittent feeding means comprises a pair of film reels, one from which the film is fed, and the other to which the film is fed, the take-up reel being spring-driven so as to exert a constant tension on the exposed film. Between the take-up reel and the exposure area are positioned a pair of clutches or film holding means which frictionally hold the film against movement by engagement with the film. Between the two holding means is positioned a revolving pin which periodically engages with the film and deflects it into a loop out of the straight path it normally occupies between the holding means. Releasing means alternatively release the holding means in time with revolution of the pin and as the pin begins to loop the film, the holding means nearest the exposure area is first released until the loop has reached its maximum size, at which time this holding means engages the film and the other holding means is released so as to allow the spring-driven take-up reel to take up the film as the pin pays out the loop.

Means are provided for varying the amount of film fed at each movement and as embodied, the pin is mounted to be variably positioned relatively to its center of revolution; the greater its eccentricity, the greater the amount of film fed. If desired, and preferably where the exposure area needs to be varied frequently, the film feeding means and exposure limiting masks are so interconnected that the masks and revolving pin are always properly related, one being set by the other so that no wastage of film occurs.

Motor means are preferably provided for moving the various parts and these motor means may be controlled so that a single exposure occurs each time the motor is energized.

By using a revolving pin between the film engaging and holding means, the film is gradually accelerated and decelerated as it is moved away from the exposure area, and is again similarly gradually accelerated and decelerated as it is fed to the take-up reel. This action avoids abrupt movements of the film, avoids strain on the mechanical parts and eliminates the possibility of breakage of the film during the feeding operation. Furthermore, the film at the exposure area remains stationary for approximately three-fourths of the time so that a relatively long exposure may be given, at the same time maintaining a rapid succession of exposures as is desirable in recording work.

It will be understood that the foregoing general description, and the following detailed description as well, are exemplary and explanatory of the invention, but are not restrictive thereof.

Referring now in detail to the illustrative embodiment of the invention as shown in Figures 1 to 5, the camera comprises a light-tight box or casing 10 having a hinged side wall 11 which is held in closed position by means of the thumb screw 12. On its under side there is provided a lens and mount 15 which may be focused in the usual manner so as to properly focus the image upon the film 16 within the exposure area defined by the aperture 17 in the double bottom wall 18 of the camera and by the masking elements 19 and 19' which may be variably positioned to limit the length of film exposed. Film 16 moves in a guideway 20 and is held in this guideway by means of pressure plate 21 which is lightly pressed against the film by means of the springs 22 which are compressed between the pressure plate 21 and the backing plate 23. This plate is hinged at 24, and is held in film pressing position by the camming action of boss 25 on the inside of the hinged cover 11, so as to exert a light pressure on the film 16.

The film is fed into the camera from a reel in a light-tight magazine positioned above and supported on the top of the camera, and is led through an aperture 30 over roller 31, through the film gate to roller 32 and upwardly and over roller 33 to the intermittent film forwarding apparatus, after which it is led over roll 34 and out of the camera through aperture 35 where it is taken up on a spring-driven reel also enclosed within the light-tight magazine. Rollers 31, 32, 33 and 34 may be provided with a central portion of reduced diameter A (Fig. 4) so that the apparatus may be employed equally well with 35 mm. or 16 mm. film, and, of course, it may operate with perforated film if that be desired.

The means for intermittently advancing the imperforate film a predetermined amount at each feeding operation and for performing this operation with accuracy, comprises a pair of rollers 38 and 39 spaced apart and positioned between rollers 33 and 34 to receive the film as it passes from roller 33 to roller 34. Film gripping means cooperate with each of the rollers 38 and 39 and serve to hold the film firmly against movement. As embodied, these gripping means comprise an arcuate shoe 40 pivotally mounted at the end of arm 41, the surface of the shoe 40 being concave and adapted to fit closely against the film wrapped around the roller 38 or 39. A disc 50 is rotatably mounted by its shaft 51 which is positioned midway between the rollers 38 and 39, and on this disc is mounted a pin 52 carrying a rotatable sleeve 53 which is adapted to contact with the backside of the film 16 and to draw this film into a loop between the rollers 38 and 39. Pin 52 is mounted on disc 50 by means of a slot 54 extending radially of the disc and by moving the pin toward or away from the center of the disc, the amount of film in the loop and the deflection of the film from its normal straight path between the rollers 38 and 39 may be varied as required by the amount of film to be fed at each feeding operation.

Means are provided for alternatively holding and releasing the film at each of the rollers 38 and 39 and for alternately operating these two means. As embodied, each of the film holding means is normally released, but is forced against its roller by means of motor-driven cam means. A lever 43 is mounted on each shaft 44 and is connected to its arm 41 and lever 43 carries at its outer end a cam roller 45 to bear against the cam, and the lever 43 is formed in two parts, pivoted together intermediate their ends and urged into alinement by means of a leaf spring 47 and held against further relative movement by means of the abutments 48.

The cams 46 are relatively angularly disposed so that the film holding means against roller 38 is first released during one quarter revolution of the cams, and then the film holding means acting against roller 39 is similarly released just as the first holding means is fully engaged. Cams 46 are mounted on shaft 51 and rotate therewith and are preferably so disposed that the holding means against roller 38 is released as the pin 52 and roller 53 move upwardly and begin to deflect the film 16 as shown in Figure 1, and when the pin 52 reaches the top of its travel, this holding means is fully applied just as the other holding means for roller 39 begins to be released and remains released until the pin 52 and roller 53 have descended sufficiently to allow the film to assume its straight path between rollers 39 and 39. The film holding means, as shown, are released by gravity under the influence of their respective cams. As the film is payed out of the loop by the travel of roller 53, the film is fed out of the camera through aperture 35 to the takeup reel 70 which is driven by spring belt 56 passing over the pulleys 57 on shaft 51 and 71 on the takeup reel shaft.

Shutter means are provided for exposing the film at the exposure area while it is stationary and as embodied, a sector shutter disc 60 having an opening 61 is rotatably mounted between the bottom of the camera and the false bottom wall 18 and is rotated by means of shaft 62 which is geared to rotate at the same angular speed as shaft 51 by means of gears 63. The opening in the shutter disc may be nearly 270° if desired, as the shutter may be opened all the time except when the film is being fed past roller 38.

Motor means are provided for rotating the shaft 51 and thereby operating the shutter 60 and the film feeding means. As embodied a motor 65 is mounted on a base plate 67 fastened to the side of the camera box 10 and drives reduction gears 68 meshing with a large gear 69 mounted on shaft 51. Due to the low speed of the shaft 51, the motor may be easily controled by means of a foot switch so as to stop with the parts in the position shown by Figure 1, at which time the shutter is closed.

Figure 6:
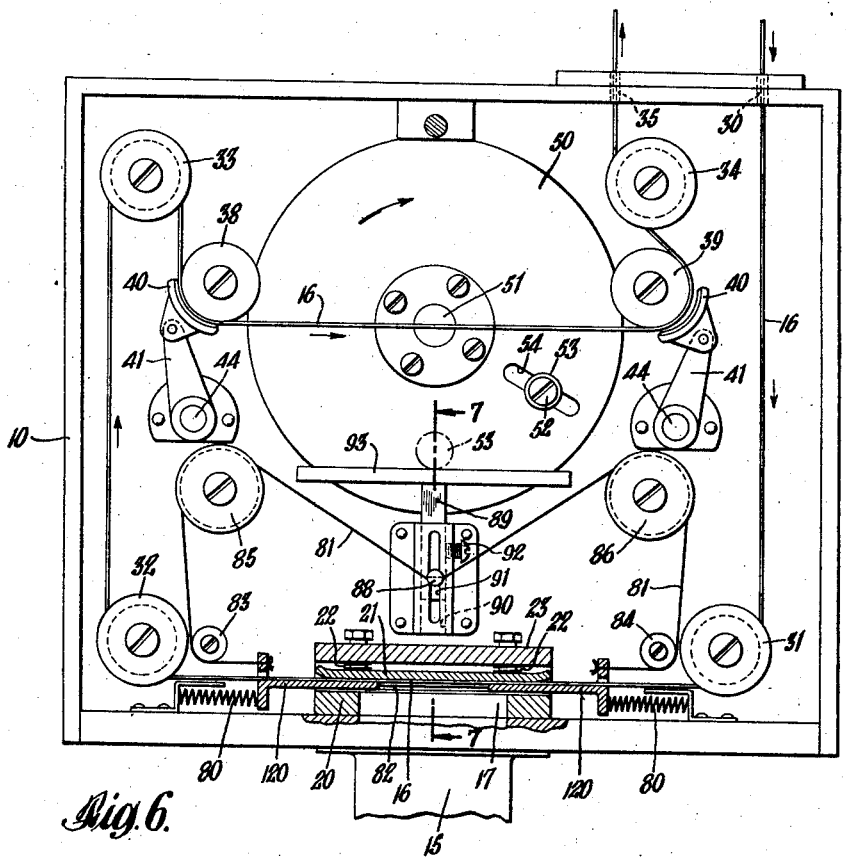
Figure 6 is a view similar to Figure 1 showing a modified embodiment of the invention.
Figure 7:
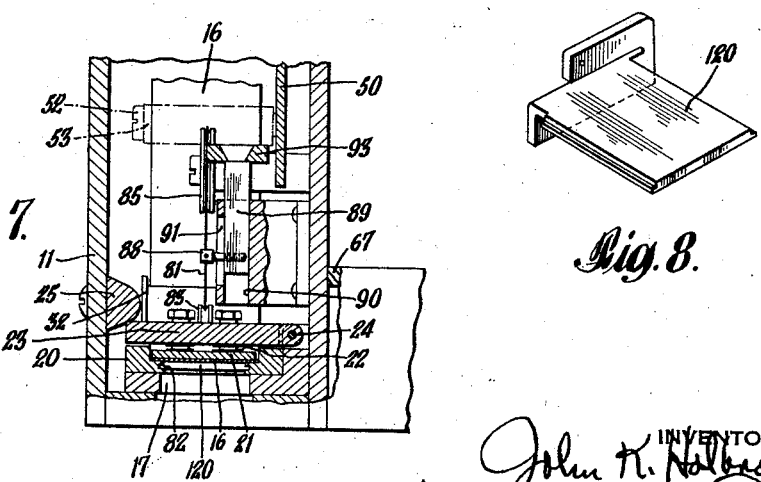
Figure 7 is a detailed section taken on the line 7—7 of Figure 6.
Figure 8:
Figure 8 is a detailed perspective view of the exposure masks utilized in the embodiment of Figures 6 and 7.

Figures 6 to 8 illustrate a modified embodiment of the invention in which means are provided for coincidentally varying the length of film fed and the exposure area. As embodied, the masks 120 are resiliently urged towards each other to close the exposure area by means of springs 80, and are held apart in proper position by means of the flexible band 81. Masks 120 slide in guide channels 82 formed in the lower portion of the film guiding plate 20. Band 81 passes over rollers 83 and 84 and rollers 85 and 86 which are the same size as, and are spaced similarly to rollers 38 and 39. At its center, band 81 is fastened to a pin 88 extending laterally from the vertically movable plunger 89 which is centrally positioned with respect to the rollers 85 and 86 and is also radial with respect to the disc 50. Plunger 89 is mounted for reciprocation in a guideway 90, through a slot 91 in which the pin 88 extends and the plunger is held in a fixed position by means of set screw 92. At its upper end, plunger 89 is provided with a T-head 93 which may be engaged by the roller 53 with set screw 92 released. After the film feed has been adjusted to the desired value by radial movement of the pin 52 and roller 53, the disc 50 need only be rotated until pin 52 is vertically alined with and below shaft 51, and then by tightening set screw 92, the exposure area masks 120 are correctly and accurately positioned for the length of film to be fed, thereby eliminating wastage of film.

The invention in its broader aspects is not limited to the specific mechanism shown and described but departures may be made therefrom within the scope of the accompanying claims without departing from the principles of the invention and without sacrificing its chief advantages.

What I claim is:

1. A recording camera having a lens, and film feeding means including a pair of means for gripping the film, a revolving pin intermediate the gripping means to deflect the film out of a straight line between the gripping means, and means for alternately releasing the gripping means, said means and pin being intergeared so that the film is fed first past one gripping means and then past the other, said revolving pin being variably positionable relatively to its center of revolution to vary the amount of film fed.

2. A recording camera having a lens, and film feeding means including a pair of means for gripping the film, a movable pin intermediate the gripping means to deflect the film out of a straight line between the gripping means, means for alternately releasing the gripping means, said means and pin being intergeared so that the film is fed first past one gripping means and then past the other, and means for varying the amount of movement of the pin to vary the amount of film fed, means for variably limiting the exposure area of the film, a member positioned in the path of the pin for varying the exposure area of the film, said member, pin and limiting means being so arranged that the exposure area corresponds to the feed of film when the pin in its movement clears the member.

3. A recording camera having a lens, and film feeding means including a pair of means for gripping the film, a movable pin intermediate the gripping means to deflect the film out of a straight line between the gripping means, means for alternately releasing the gripping means, said means and pin being intergeared so that the film is fed first past one gripping means and then past the other, means for varying the amount of movement of the pin to vary the amount of film feed, and means for variably limiting the area of film exposed in accordance with the film feed.

4. A recording camera having a lens, and film feeding means including a pair of means for gripping the film, a movable pin intermediate the gripping means to deflect the film out of a straight line between the gripping means, means for alternately releasing the gripping means, said means and pin being intergeared so that the film is fed first past one gripping means and then past the other, means for varying the amount of movement of the pin to vary the amount of film feed, and means for variably limiting the area of film exposed in accordance with the film feed, a member positioned in the path of the pin for varying the exposure area of the film, said member, pin and limiting means being so arranged that the exposure area corresponds to the feed of film when the pin in its movement clears the member.

5. A recording camera having a lens, a shutter and film feeding means including a pair of film gripping means, a film engaging member movable between the film gripping means to deflect the film out of a straight path and pull it past one of the gripping means and allow it to be fed past the other, means for varying the movement of the member to vary the length of film fed, means for automatically and alternately releasing the film gripping means in timed relation to the film feeding operation of the member, means for masking the exposure area of the film and means for varying the position of the masking means so that the length of film exposed may equal the length of film fed.

JOHN K. HOLBROOK.